US009886860B2

(12) United States Patent
Shamasundar

(10) Patent No.: US 9,886,860 B2
(45) Date of Patent: Feb. 6, 2018

(54) SYSTEMS AND METHODS FOR PROCESSING CONCATENATED DATALINK MESSAGES

(71) Applicant: Honeywell International Inc., Morristown, NJ (US)

(72) Inventor: Raghu Shamasundar, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 330 days.

(21) Appl. No.: 14/739,352

(22) Filed: Jun. 15, 2015

(65) Prior Publication Data

US 2016/0364987 A1 Dec. 15, 2016

(51) Int. Cl.
*G01C 21/00* (2006.01)
*G01C 23/00* (2006.01)
(Continued)

(52) U.S. Cl.
CPC .......... *G08G 5/0013* (2013.01); *G07C 5/008* (2013.01); *G07C 5/06* (2013.01); *G08G 5/0021* (2013.01); *G08G 5/0039* (2013.01)

(58) Field of Classification Search
CPC .. G08G 5/0013; G08G 5/0021; G08G 5/0039; G07C 5/008; G07C 5/06
(Continued)

(56) References Cited

U.S. PATENT DOCUMENTS 8,305,208 B2 11/2012 Judd
8,335,988 B2 12/2012 Fahy
(Continued)

FOREIGN PATENT DOCUMENTS

WO 2014115139 7/2014

OTHER PUBLICATIONS

Smith et al., "An Assessment of Flight Crew Experiences With Fans-1 Controller-Pilot Data Link Communiation in the South Pacific", "4th USA/Europe Air Traffic Management R&D Seminar", Dec. 3-7, 2001, pp. 1-11, Published in: US.
(Continued)

*Primary Examiner* — Tanmay Shah
(74) *Attorney, Agent, or Firm* — Fogg & Powers LLC

(57) ABSTRACT

Systems and methods for processing concatenated datalink messages are provided. In one embodiment, a method for processing concatenated datalink messages comprises: receiving an ATC concatenated message from a ground center comprising a plurality of message elements; presenting the concatenated message in a first message log display page on a human machine interface display; when the concatenated message is selected from the first message log display page, presenting the concatenated message in a first message display page on the human machine interface display, wherein the first message display page comprises a pilot response prompt; categorizing the plurality of message elements of the concatenated message into loadable and non-loadable elements; monitoring flight parameters obtained from an aircraft's flight management system to determine an action status for each of the non-loadable elements; and displaying on the human machine interface display the action status associated with at least one non-loadable message element.

20 Claims, 5 Drawing Sheets

(51) Int. Cl.
*G08G 5/00* (2006.01)
*G07C 5/06* (2006.01)
*G07C 5/00* (2006.01)

(58) Field of Classification Search
USPC .......................................................... 340/971
See application file for complete search history.

(56) References Cited

U.S. PATENT DOCUMENTS

| | | | | |
|---|---|---|---|---|
| 8,571,586 | B2 | 10/2013 | McGuffin et al. | |
| 8,681,019 | B2 | 3/2014 | McGuffin | |
| 2008/0045198 | A1* | 2/2008 | Bhogal ................ | G08G 5/0013 455/414.4 |
| 2008/0154486 | A1* | 6/2008 | Coulmeau ............ | G08G 5/0013 701/120 |
| 2014/0278037 | A1* | 9/2014 | Choksi ................... | G08G 5/065 701/120 |

OTHER PUBLICATIONS

Letsu-Dake et al., "Human Factors Investigation of Manual and Loadable Data Comm Messages in Nextgen", "Digital Avionics Systems Conference (DASC)", 2013, pp. 5A1-1 to 5A1-14.

* cited by examiner

SYSTEMS AND METHODS FOR PROCESSING CONCATENATED DATALINK MESSAGES

BACKGROUND

Increasingly, communications between commercial aircraft and air traffic control (ATC) ground stations are carried out through digital media such as Controller-Pilot Data Link Communications (CPDLC) messages. During the course of a commercial air flight, a significant number of lot of messages are exchanged between the aircrew and controllers at the ATC ground stations. These messages may be related to matters such as traffic avoidance or weather avoidance or enhanced route, or other reasons. Many of these messages may be formatted as a concatenated message (CM) meaning that the transmitted message serves as an envelope that carries multiple message elements, each communicating diverse items of information to the flight crew. Such concatenated messages may include both loadable message elements (meaning that the contents of the element may be directly loaded into the aircraft's flight management system) and non-loadable message elements (meaning that the contents of the element describe an action which must be manually performed by the pilot either immediately or at some future point in time). With current ATC messaging systems once a concatenated message is accepted by the pilot, the loadable message elements may be loaded into the flight management system. However, it remains the pilot's responsibility to keep track of actions that must be manually performed as specified in any non-loadable message elements.

For the reasons stated above and for other reasons stated below which will become apparent to those skilled in the art upon reading and understanding the specification, there is a need in the art for alternate systems and methods for processing concatenated datalink messages.

SUMMARY

The Embodiments of the present invention provide methods and systems for processing concatenated datalink messages and will be understood by reading and studying the following specification.

In one embodiment, a method for processing concatenated datalink messages, comprises: receiving an ATC concatenated message from an ATC ground center, the ATC concatenated message comprising a plurality of message elements; presenting the ATC concatenated message in a first message log display page on a human machine interface display; when the ATC concatenated message is selected from the first message log display page, presenting the ATC concatenated message in a first message display page on the human machine interface display; categorizing the plurality of message elements of the ATC concatenated message into loadable and non-loadable elements; monitoring flight parameters obtained from an aircraft's flight management system to determine an action status for each of the non-loadable elements; and displaying on the human machine interface display the action status associated with at least one non-loadable message element.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

With embodiments of the present disclosure, once a concatenated message is received by an aircraft's communication management system from an ATC ground station, it is processed by a concatenated message processor implemented using on-board avionics hardware and/or software. The concatenated message processor identifies which elements are loadable and which are not. Those message elements that are loadable may be loaded into the flight planning system of the aircraft's Flight Management System which will then automatically act on the contents of those elements when flight parameters indicated by the loadable elements are met. Those message elements comprising actions that are not loadable are monitored so that a pilot is provided with information regarding 1) yet to be completed actions that need to be manually taken by the flight crew, 2) upcoming action windows associated with those yet to be completed actions, 3) actions that have been completed, and 4) missed actions that should have been taken in the past, but were not.

Figure 1:
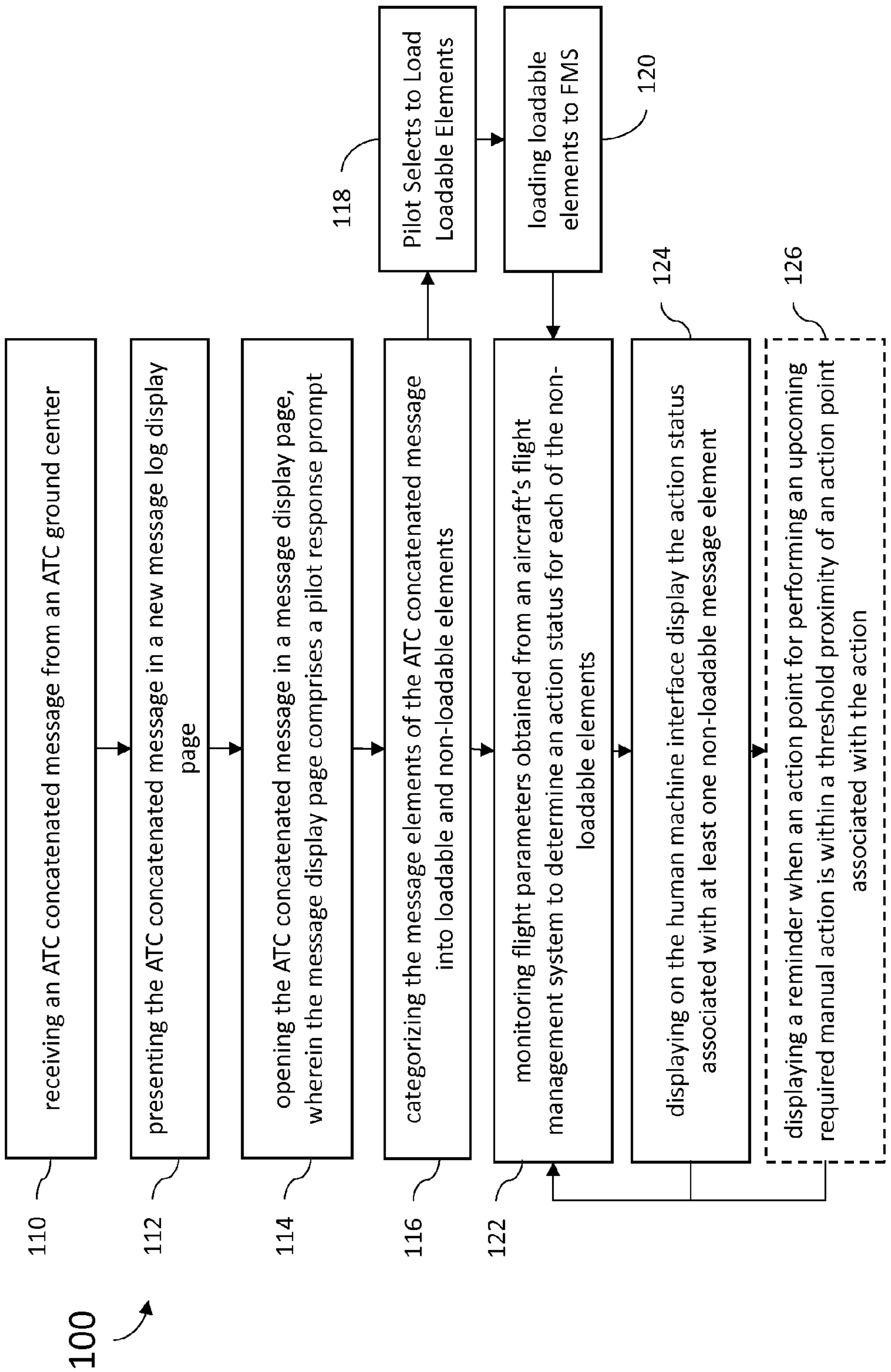
FIG. 1 is a flow chart illustrating a processes of one embodiment of the present disclosure.
Figure 2:
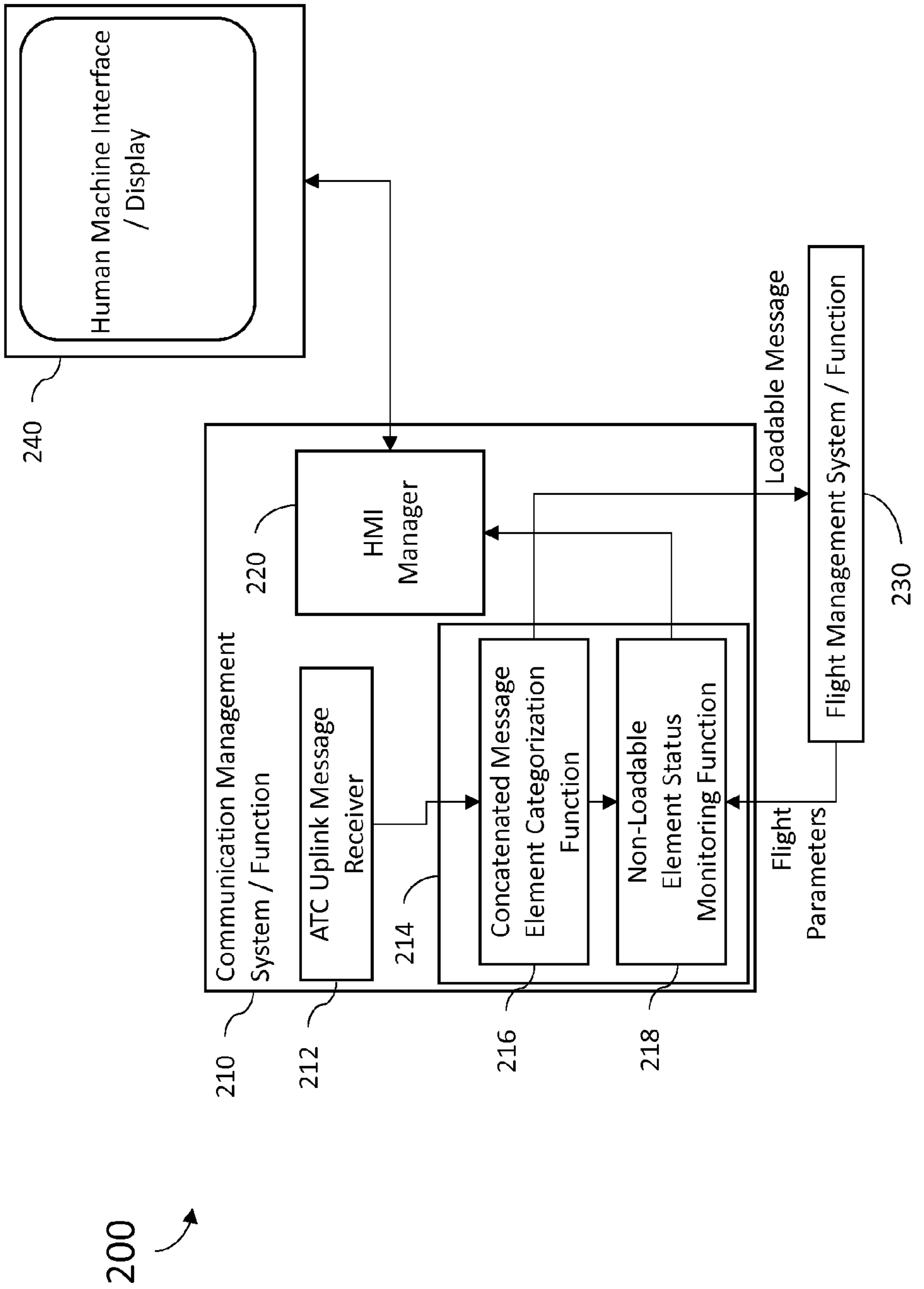
FIG. 2 is a diagram illustrating a system of one embodiment of the present disclosure.

FIG. 1 is a flow chart illustrating a method 100 for processing concatenated datalink messages of one embodiment of the present disclosure. In one embodiment, method 100 may be implemented using avionics hardware systems onboard an aircraft such as the avionics system 200 shown in FIG. 2. Avionics system 200 comprises a communication management system (CMS) 210, a flight management system 230 and a human machine interface (HMI) 240. As the term is used herein, a "communication management system" is intended to encompass avionics implemented in an aircraft which are typically referred to as either the "communication management system" or "communication management function" for the aircraft. Similarly, as the term is used herein, a "flight management system" is intended to encompass avionics implemented in an aircraft which are typically referred to as either the "flight management system" or "flight management function" for the aircraft. The human machine interface 240 any device or combination of devices on-board the aircraft which may be used to convey information from avionics to the flight crew, or that permits the flight crew to enter information into the avionics. For example, in one embodiment the human machine interface 240 may comprise a touch-screen display that displays data to the flight crew and enables the flight crew to enter data or make selections from options presented on the display. In other embodiments, the human machine interface 240 may comprise a display used in conjunction with a pilot controlled cursor (via a joystick or trackpad, for example), or an aircraft multi-function display (MFD), or any other element or set of elements of the cockpit display system (CDS) which may function as a human machine interface. With elements of the present disclosure, the communication management system 210 comprises a concatenated message processor 214 which may be operated as described with respect to the method 100 shown in FIG. 1.

In FIG. 1, method 100 begins at 110 with receiving an ATC concatenated message from an ATC ground center. In one embodiment, this may be performed by the ATC Uplink Message Receiver 212. The ATC concatenated message comprises a plurality of message elements which may include loadable message elements and non-loadable message elements. In some embodiments, the ATC concatenated message from the ATC ground center are Controller-Pilot Data Link Communications (CPDLC) messages.

The method proceeds to 112 with presenting the ATC concatenated message in a new message log display page. In one embodiment the arrival of the ATC concatenated message is displayed via Human Machine Interface 240 as a new (meaning that is was not previously opened) concatenated message such as illustrated at 301 in FIG. 3A. For example, in one implementation, the concatenated message processor 214 receives the new ATC concatenated message from the ATC Uplink Message Receiver 212 and adds that message to a new uplink message log 213 managed by CMS 210. HMI manager 220 is a function which may be implemented within communication management system 210 in various ways to manage the display of information from CMS 210 onto HMI 240, and process pilot entries entered into HMI 240 for use by CMS 210. As such, in various alternate implementations, HMI manager 220 may simply be an integrated function of CMS 210 or implemented as a distinct separate element either within or external to CMS 210. When the pilot utilizes HMI 240 to access the new uplink message log 213, HMI manager 220 processes that request by generating an ATC New Message Log display page 310 as shown in FIG. 3. The ATC New Message Log display page 310 presents a collapsed form 320 of the ATC concatenated message (shown at 322) which may show a one-line summary of each of the plurality of message elements contained within the ATC concatenated message. The ATC New Message Log display page 310 also provides a user selectable “New Message” prompt 322 which allows the pilot to open and read the full content of the ATC message.

Figure 3B:
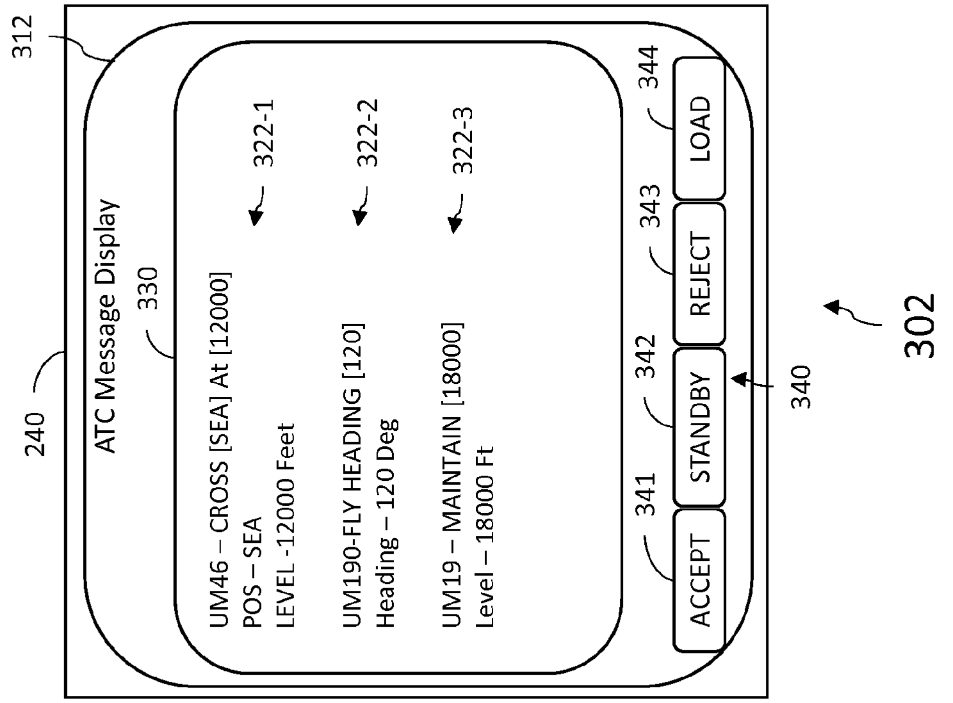
FIGS. 3A-3D are example human machine interface display screens for embodiments of the present disclosure.
Figure 3A:
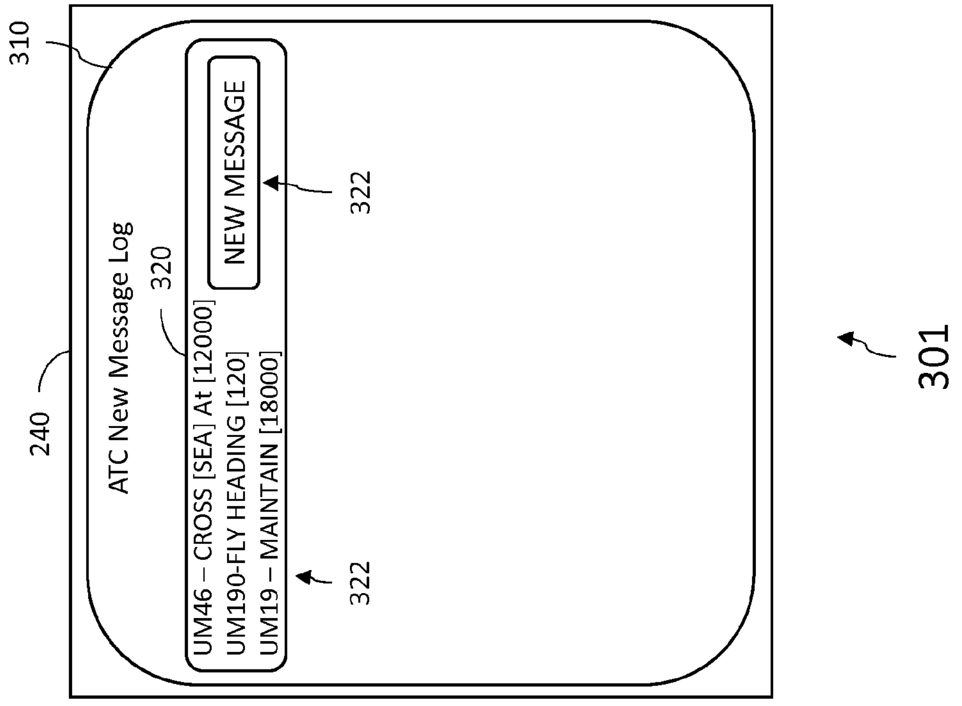

The method may then proceed to 114 with presenting the ATC concatenated message in a message display page, wherein the message display page comprises a pilot response prompt. When the pilot selects the New Message prompt 332, HMI Manger 220 opens and presents the ATC concatenated message onto HMI 240 in a message display page 312. As shown generally at 302 in FIG. 3B message display page 312 presents the pilot with an expanded form 330 of the ATC concatenated message that displays detailed content of the message elements of the ATC concatenated message. Here, a first message element decoded from the ATC concatenated message is expanded and displayed at 322-1, a second message element decoded from the ATC concatenated message is expanded and displayed at 322-2, and a third message element decoded from the ATC concatenated message is expanded and displayed at 322-3. The detailed content of the several message elements may fit within the space available of a single display page (as shown in FIG. 3B), but if the detailed content contains too much data to present on HNI 240 as a single page, HMI 240 may implement page scrolling or page turning to provide access to the full text of each of the message elements to the pilot. In addition to displaying the ATC concatenated message in the expanded form 330, message display page 312 further presents a pilot response prompt 340. Pilot response prompt 340 may provide multiple individually selectable response prompts, and as shown in FIG. 3B, may include at least an ACCEPT prompt 341, a STANDBY prompt 342 and a REJECT prompt 343. Selection of the STANDBY prompt 342 can be used to indicate to the ATC controller that the pilot is aware of the uplink message, but not immediately ready to accept or reject the contents of the message. Selection of the REJECT prompt 343 will indicate to the ATC controller that the pilot, for whatever reason, does not agree with one or more actions set forth in the ATC concatenated message, in which case the ATC controller may replace those actions with alternate actions via a subsequent ATC concatenated message. Selection of the ACCEPT prompt 341 indicates that the pilot concurs with the actions specified in the ATC concatenated message and sends the response to the ground station.

The method may then proceed to 116 with categorizing the message elements of the ATC concatenated message into loadable and non-loadable elements, which may occur either before or after the message is accepted. In one embodiment, this categorizing is performed by a CM Element Categorization Function 216 within the concatenated message processor 214. As mentioned above, loadable message elements are elements that can be loaded directly into the flight planning system of the aircraft’s flight management system 230 so that the flight management system 230 may automatically initiate the actions specified by those elements when certain flight parameters are achieved. In one implementation, after the ACCEPT prompt 341 is selected by the pilot, if the ATC concatenated message includes any loadable message elements, a LOAD prompt 344 will appear or otherwise become active so that it may be selected by the pilot. When the pilot selected the LOAD prompt 344 (shown at block 118), any loadable message elements will be loaded into Flight Management System 230 (shown at block 120).

If the ATC concatenated message includes any non-loadable message elements, then method 100 will proceed to 122 with monitoring flight parameters obtained from an aircraft’s flight management system to determine an action status for each of the non-loadable elements, and to 124 with displaying on the human machine interface display the action status associated with at least one non-loadable message element. In one embodiment, this monitoring is performed by a Non-Loadable Element Status Monitoring Function 218 within the concatenated message processor 214. More specifically, Non-Loadable Element Status Monitoring Function 218 loads various flight parameters from the Flight Management System 230 to determine when a manual pilot action specified by a non-loadable message element has been completed, and if it has not been completed, the remaining margin (e.g. in flight time or distance) before the action needs to be completed. If the time for taking the action has passed without the action being taken, the Non-Loadable Element Status Monitoring Function 218 determines the elapsed flight time and/or distance that has elapsed since the action should have been taken.

Figure 3C:
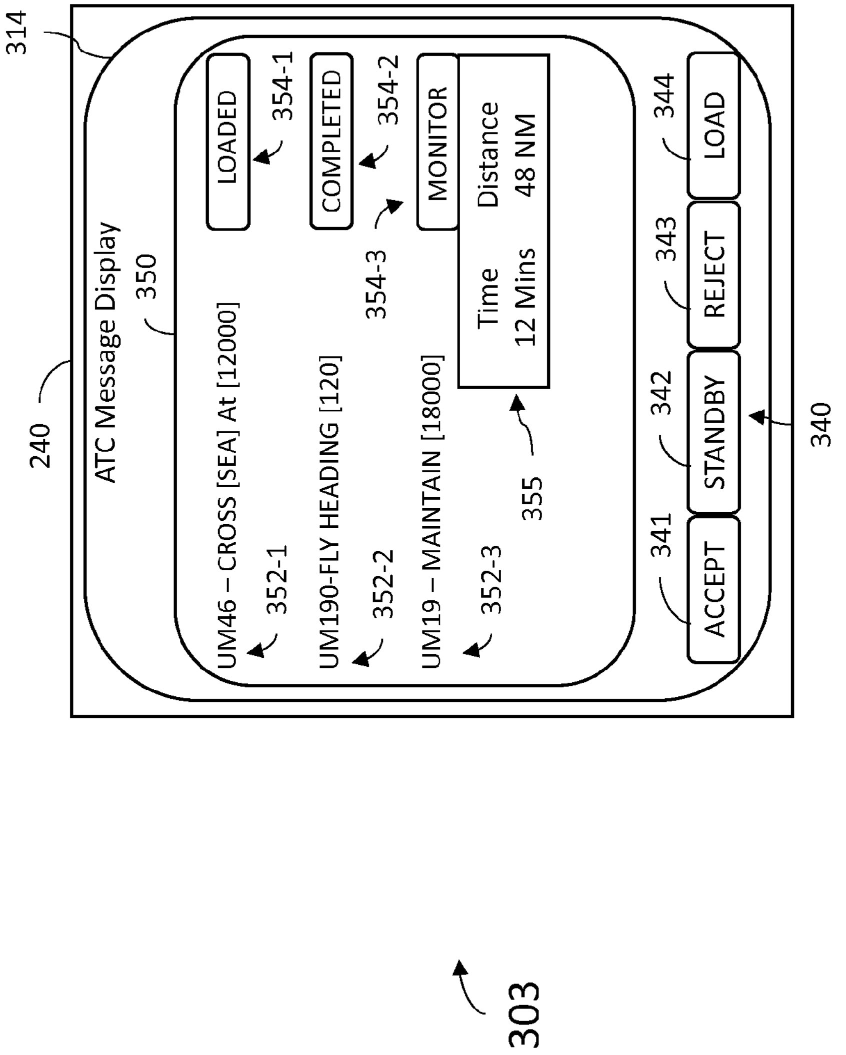

In one embodiment, as shown generally at 303 in FIG. 3C, the Non-Loadable Element Status Monitoring Function 218 (via action status update data provided to HMI Manger 220) provides an updated message display page 314 which displays to the pilot the current status of each message element of the ATC concatenated message. Within display page 314, ATC concatenated message is shown in expanded form 350 along with the current status of each message element. For example, the action required by a first message element 351-1 is displayed textually at 352-1 next to a status field 354-1 for that element. In this example, the first message element 351-1 comprises a loadable message element "UM46—CROSS [SEA] At [12000]" and as indicated by the status shown its associated status field 354-1, that message element has already been "LOADED" into the Flight Management System 230. Thus, the pilot is made aware that no further manual action by the flight crew will be needed to address that message element. The action required by a second message element 351-2 is displayed textually at 352-2 next to a status field 354-2 for that element. Here, the second message element 351-2 comprises a non-loadable message element "UM190—FLY HEADING [120]" and as indicated by the status shown its associated status field 354-2, the manual action required by that message element has already been "COMPLETED" by the flight crew so that no further manual action by the flight crew will be needed to address that message element. The action required by a third message element 351-3 is displayed textually at 352-3 next to a status field 354-3 for that element. Here, the third message element 351-3 comprises a non-loadable message element "UM19—MAINTAIN [18000]" which, as indicated by the status shown its associated status field 354-3 has an action status of "MONITOR" meaning that the manual actions required of the flight crew have yet to be completed, and therefore the Non-Loadable Element Status Monitoring Function 218 continues to monitor and update that element status based on flight parameters and characteristics from the flight management system 230. Further, because the third message element 351-3 is in MONITOR status, the updated message display page 314 may further display next to the status field 354-3 a margin indication 355. This margin indicate 355 may, for example, display an estimated flight time until the pilot need to take the specified action, or an estimated distance (e.g. in nautical miles) until the pilot need to take the specified action, or both. Similarly, if the point in time where the pilot should have taken a manual action passes without the action being completed, margin indicator 355 may instead display an elapsed time or distance since the action should have occurred.

As shown at block 126, in some embodiments, the Non-Loadable Element Status Monitoring Function 218 may optionally initiate pilot reminders at specified points to remind the pilot when an action point for performing an upcoming required manual action is within a threshold proximity of an action point associated with the action. That is, the pilot may be reminded by a message displayed on HMI 240 (or alternately on any cockpit display) anytime an action remains uncompleted within a set number of minutes or a set distance from an action point for the action specified in the non-loadable message element. For example, if a non-loadable message element instruct the pilot to climb to 9000 feet upon reaching waypoint SEA, then Non-Loadable Element Status Monitoring Function 218 may generate a reminder message/alert to the pilot (even when an unrelated page is currently being displayed on HMI 240) when the aircraft is within, for example, 1 minute or 2 nautical miles of waypoint SEA.

Figure 3D:
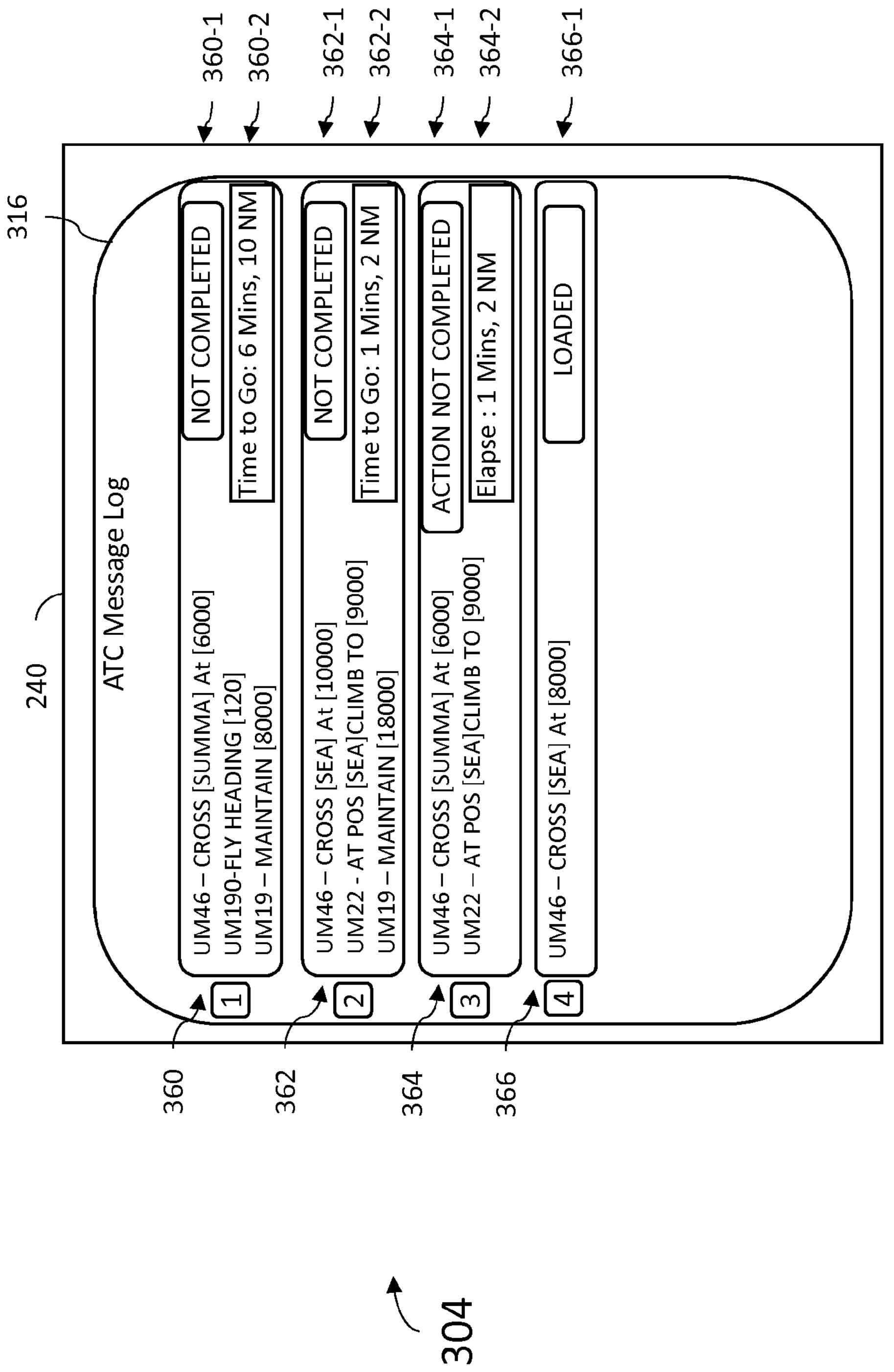

In one embodiment, concatenated message processor 214 may also provide action status updates on a per ATC concatenated message as shown generally at 304 in FIG. 3D. In FIG. 3D, HMI 240 displays an ATC Message Log display page 316 listing multiple uplink ATC messages 360, 362, 364 and 366. Page 316 lists each ATC concatenated message in compressed form along with a status of actions associated with the message elements within each message. For example, a first ATC concatenated message 360 is displayed in compressed form with a summary of each message element. Action status indicator 360-1 shows the pilot that at least one manual action for a non-loadable has yet to be completed for message 360, and associated margin indicator 360-2 indicates the time and distance remaining until the next action from that message needs to occur. Similarly, a second ATC concatenated message 362 is displayed in compressed form with a summary of each message element. Action status indicator 362-1 shows the pilot that at least one manual action for a non-loadable has yet to be completed for message 362, and associated margin indicator 362-2 indicates the time and distance remaining until the next action from that message needs to occur.

The third ATC concatenated message 364 is displayed in compressed form with a summary of each message element, but in this case, action status indicator 364-1 informs the pilot that at least one manual action specified by a message element in message 364 was not completed and missed. Associated margin indicator 364-2 indicates the time and distance which has elapsed since the action point for that action was missed. If more than one non-loadable message element action within an ATC concatenated message has been missed, the elapsed time for the oldest missed action is displayed. In some embodiments, different colors or other display attributes may be used to display action status indicators and/or margin indicators on HMI 240 that vary depending on the status condition associated with the non-loadable message element. For example an action status indicating a completed status condition could be displayed using a first color, an action status indicating a yet to be completed (but not yet missed) status condition could be displayed using a second color, and an action status indicating a missed action status condition could be displayed using a thirds color. Similarly, the margin indicators can change color depending on the remaining time or distance to an action point, and when the action point has been missed.

Finally, the fourth ATC uplink message 366 only is displayed in compressed form, but only includes a single message element which was a loadable message element. Here, action status indicator 366-1 informs the pilot that the loadable message element has been loaded to the flight planning system of the Flight Management System.

EXAMPLE EMBODIMENTS

Example 1 includes a method for processing concatenated Air Traffic Control (ATC) datalink messages, the method comprising: receiving an ATC concatenated message from an ATC ground center, the ATC concatenated message comprising a plurality of message elements; presenting the ATC concatenated message in a first message log display page on a human machine interface display; when the ATC concatenated message is selected from the first message log display page, presenting the ATC concatenated message in a first message display page on the human machine interface display, wherein the first message display page comprises a pilot response prompt; categorizing the plurality of message elements of the ATC concatenated message into loadable and non-loadable elements; monitoring flight parameters obtained from an aircraft's flight management system to determine an action status for each of the non-loadable elements; and displaying on the human machine interface display the action status associated with at least one non-loadable message element.

Example 2 includes the method of any of examples 1, wherein when the ATC concatenated message comprises at least one message element categorized as a loadable message element, the method further comprises: loading the at least one message element categorized as a loadable message element into a flight planning system of the aircraft's flight management system.

Example 3 includes the method of any of examples 1, wherein the ATC concatenated message is an uplink Controller-Pilot Data Link Communications (CPDLC) message comprising the plurality of message elements.

Example 4 includes the method of any of examples 1, wherein the ATC concatenated message is displayed in a collapsed form on the first message log display page and displayed in an expand form on the first message display page.

Example 5 includes the method of any of examples 1, wherein the flight parameters obtained from the aircraft's flight management system comprises data indicative of at least one of: a position of the aircraft, an estimated flight time to reach a waypoint identified in at least one non-loadable message element, or an estimated distance to reach a waypoint identified in at least one non-loadable message element.

Example 6 includes the method of any of examples 1, wherein monitoring flight parameters obtained from the aircraft's flight management system further comprises: determining whether an action associated with at least one of the non-loadable elements is either completed or not completed.

Example 7 includes the method of example 6, wherein monitoring flight parameters obtained from an aircraft's flight management system further comprises at least one of: determining a flight time until an action point associated with at least one of the non-loadable elements will be reached; or determining a distance to the action point associated with at least one of the non-loadable elements.

Example 8 includes the method of any of examples 6-7, wherein monitoring flight parameters obtained from an aircraft's flight management system further comprises: determining when an action associated with at least one of the non-loadable elements has been missed.

Example 9 includes the method of any of examples 1-8, wherein displaying on the human machine interface display the action status associated with at least one non-loadable message element further comprises: displaying a reminder of an action associated with the at least one non-loadable message element when the aircraft is within a threshold proximity of an action point associated with the action.

Example 10 includes the method of any of examples 1-9, wherein displaying on the human machine interface display the action status associated with each non-loadable message element further comprises: displaying the action status associated with each of the plurality of message elements of the ATC concatenated message on a second message display page.

Example 11 includes the method of any of examples 1-10, wherein displaying on the human machine interface display the action status associated with each non-loadable message element further comprises: displaying the action status associated with at least one of the plurality of message elements of the ATC concatenated message on a second message log display page.

Example 12 includes the method of any of examples 1-11, wherein displaying on the human machine interface display the action status associated with at least one non-loadable message element further comprises: displaying at least one action status on the human machine interface using a color assigned to represent a specific status condition.

Example 13 includes an avionics communication system, the system comprising: an air traffic control uplink message receiver; a flight management system; a human machine interface; and an on-board avionics system coupled to the air traffic control uplink message receiver and the human machine interface, the on-board avionics system comprising a concatenated message processor that includes a concatenated message element categorization function and a non-loadable element status monitoring function; wherein the air traffic control uplink message receiver is configured to receive air traffic control concatenated messages via the air traffic control uplink message receiver and the concatenated message processor is configured to input the air traffic control concatenated messages received by the air traffic control uplink message receiver; wherein each air traffic control concatenated message comprises a plurality of message elements, and the concatenated message element categorization function is configured to categorize each of the plurality of message elements as either loadable elements or non-loadable elements; and wherein the non-loadable element status monitoring function is configured to determine an action status for each of the plurality of message elements categorized as non-loadable elements based on an action defined within in each of the non-loadable elements and flight parameters obtained from the flight management system.

Example 14 includes the system of example 13, wherein the concatenated message processor is configured to load each of the plurality of message elements categorized as loadable elements to a flight planning system of the flight management system.

Example 15 includes the system of any of examples 13-14, wherein the flight parameters obtained from the aircraft's flight management system comprises data indicative of at least one of: a position of the aircraft, an estimated flight time to reach a waypoint identified in at least one non-loadable message element, or an estimated distance to reach a waypoint identified in at least one non-loadable message element.

Example 16 includes the system of any of examples 13-15, wherein concatenated message processor is configured to display on the human machine interface a first action status associate with a first message element of a first air traffic control concatenated message, the action status indicating at least one of: whether an action associated with the first message element is either completed or not completed; a flight time until an action point associated with the first message element will be reached; a distance to the action point associated with the first message element; when an action associated with the first message element has been missed.

Example 17 includes the system of any of examples 13-16, wherein the non-loadable element status monitoring function is configured to display a reminder of an action associated with the at least one non-loadable message element when the aircraft is within a threshold proximity of an action point associated with the action.

Example 18 includes a concatenated message processor, the processor comprising: a concatenated message element categorization function; and a non-loadable element status monitoring function; wherein the concatenated message processor is configured to receive air traffic control concatenated messages via an air traffic control uplink message receiver, the air traffic control concatenated messages each comprising a plurality of message elements; wherein the concatenated message element categorization function is configured to categorize each of the plurality of message elements as either loadable elements or non-loadable elements; wherein the non-loadable element status monitoring function is configured to determine an action status for each of the plurality of message elements categorized as non-loadable elements based on an action defined within in each of the non-loadable elements and flight parameters obtained from a flight management system; and wherein the concatenated message processor is configured to display an action status for at least one of the plurality of message elements via a human machine interface.

Example 19 includes the processor of example 18, wherein for a first message element of the plurality of message elements, the action status indicates at least one of: whether an action associated with the first message element is complete or is not complete; a flight time until an action point associated with the first message element will be reached; a distance to the action point associated with the first message element; or when an action associated with the first message element has been missed.

Example 20 includes the processor of any of examples 18-19, wherein the concatenated message processor is configured to load each of the plurality of message elements categorized as loadable elements to a flight planning system of the flight management system.

In various alternative embodiments, system elements, method steps, or examples described throughout this disclosure (such as the communication management system, the concatenated message processor, the CM Element Categorization Function, the Non-Loadable Element Status Monitoring Function, or sub-parts thereof, for example) may be implemented on one or more computer systems, field programmable gate array (FPGA), or similar devices comprising a processor and memory hardware executing code to realize those elements, processes, or examples, said code stored on a non-transient data storage device. Therefore other embodiments of the present disclosure may include such a processor and memory hardware as well as elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method for processing concatenated Air Traffic Control (ATC) datalink messages, the method comprising:

receiving an ATC concatenated message from an ATC ground center, the ATC concatenated message comprising a plurality of message elements;

presenting the ATC concatenated message in a first message log display page on a human machine interface display;

when the ATC concatenated message is selected from the first message log display page, presenting the ATC concatenated message in a first message display page on the human machine interface display, wherein the first message display page comprises a pilot response prompt;

categorizing the plurality of message elements of the ATC concatenated message into loadable and non-loadable elements, wherein non-loadable elements are elements that describe an action to be manually performed either immediately or at some future point in time and are not elements loadable into the aircraft's flight management system;

monitoring flight parameters obtained from an aircraft's flight management system to determine an action status for each of the non-loadable elements; and displaying on the human machine interface display the action status associated with at least one non-loadable message element.

2. The method of claim 1, wherein when the ATC concatenated message comprises at least one message element categorized as a loadable message element, the method further comprises:

loading the at least one message element categorized as a loadable message element into a flight planning system of the aircraft's flight management system.

3. The method of claim 1, wherein the ATC concatenated message is an uplink Controller-Pilot Data Link Communications (CPDLC) message comprising the plurality of message elements.

4. The method of claim 1, wherein the ATC concatenated message is displayed in a collapsed form on the first message log display page and displayed in an expand form on the first message display page.

5. The method of claim 1, wherein the flight parameters obtained from the aircraft's flight management system comprises data indicative of at least one of: a position of the aircraft, an estimated flight time to reach a waypoint identified in at least one non-loadable message element, or an estimated distance to reach a waypoint identified in at least one non-loadable message element.

6. The method of claim 1, wherein monitoring flight parameters obtained from the aircraft's flight management system further comprises:

determining whether an action associated with at least one of the non-loadable elements is either completed or not completed.

7. The method of claim 6, wherein monitoring flight parameters obtained from an aircraft's flight management system further comprises at least one of:

determining a flight time until an action point associated with at least one of the non-loadable elements will be reached; or determining a distance to the action point associated with at least one of the non-loadable elements.

8. The method of claim 6, wherein monitoring flight parameters obtained from an aircraft's flight management system further comprises:

determining when an action associated with at least one of the non-loadable elements has been missed.

9. The method of claim 1, wherein displaying on the human machine interface display the action status associated with at least one non-loadable message element further comprises:

displaying a reminder of an action associated with the at least one non-loadable message element when the aircraft is within a threshold proximity of an action point associated with the action.

10. The method of claim 1, wherein displaying on the human machine interface display the action status associated with each non-loadable message element further comprises:

displaying the action status associated with each of the plurality of message elements of the ATC concatenated message on a second message display page.

11. The method of claim 1, wherein displaying on the human machine interface display the action status associated with each non-loadable message element further comprises:

displaying the action status associated with at least one of the plurality of message elements of the ATC concatenated message on a second message log display page.

12. The method of claim 1, wherein displaying on the human machine interface display the action status associated with at least one non-loadable message element further comprises:

displaying at least one action status on the human machine interface using a color assigned to represent a specific status condition.

13. An avionics communication system, the system comprising:

an air traffic control uplink message receiver;

a flight management system;

a human machine interface; and an on-board avionics system coupled to the air traffic control uplink message receiver and the human machine interface, the on-board avionics system comprising a concatenated message processor that includes a concatenated message element categorization function and a non-loadable element status monitoring function;

wherein the air traffic control uplink message receiver is configured to receive air traffic control concatenated messages via the air traffic control uplink message receiver and the concatenated message processor is configured to input the air traffic control concatenated messages received by the air traffic control uplink message receiver;

wherein each air traffic control concatenated message comprises a plurality of message elements, and the concatenated message element categorization function is configured to categorize each of the plurality of message elements as either loadable elements or non-loadable elements, wherein non-loadable elements are elements that describe an action to be manually performed either immediately or at some future point in time and are not elements loadable into the flight management system; and wherein the non-loadable element status monitoring function is configured to determine an action status for each of the plurality of message elements categorized as non-loadable elements based on an action defined within in each of the non-loadable elements and flight parameters obtained from the flight management system.

14. The system of claim 13, wherein the concatenated message processor is configured to load each of the plurality of message elements categorized as loadable elements to a flight planning system of the flight management system.

15. The system of claim 13, wherein the flight parameters obtained from the aircraft's flight management system comprises data indicative of at least one of: a position of the aircraft, an estimated flight time to reach a waypoint identified in at least one non-loadable message element, or an estimated distance to reach a waypoint identified in at least one non-loadable message element.

16. The system of claim 13, wherein concatenated message processor is configured to display on the human machine interface a first action status associate with a first message element of a first air traffic control concatenated message, the action status indicating at least one of:

whether an action associated with the first message element is either completed or not completed;

a flight time until an action point associated with the first message element will be reached;

a distance to the action point associated with the first message element;

when an action associated with the first message element has been missed.

17. The system of claim 13, wherein the non-loadable element status monitoring function is configured to display a reminder of an action associated with the at least one non-loadable message element when the aircraft is within a threshold proximity of an action point associated with the action.

18. A concatenated message processor, the processor comprising:

a concatenated message element categorization function; and a non-loadable element status monitoring function;

wherein the concatenated message processor is configured to receive air traffic control concatenated messages via an air traffic control uplink message receiver, the air traffic control concatenated messages each comprising a plurality of message elements;

wherein the concatenated message element categorization function is configured to categorize each of the plurality of message elements as either loadable elements or non-loadable elements;

wherein the non-loadable element status monitoring function is configured to determine an action status for each of the plurality of message elements categorized as non-loadable elements based on an action defined within in each of the non-loadable elements and flight parameters obtained from a flight management system; and wherein the concatenated message processor is configured to display an action status for at least one of the plurality of message elements via a human machine interface;

wherein non-loadable elements are elements that describe an action to be manually performed either immediately or at some future point in time and are not elements loadable into the flight management system.

19. The processor of claim 18, wherein for a first message element of the plurality of message elements, the action status indicates at least one of:

whether an action associated with the first message element is complete or is not complete;

a flight time until an action point associated with the first message element will be reached;

a distance to the action point associated with the first message element; or when an action associated with the first message element has been missed.

20. The processor of claim 18, wherein the concatenated message processor is configured to load each of the plurality of message elements categorized as loadable elements to a flight planning system of the flight management system.

* * * * *